United States Patent [19]
Rabek

[11] 3,965,746
[45] June 29, 1976

[54] PRESSURE TRANSDUCER
[75] Inventor: Jan W. Rabek, Los Angeles, Calif.
[73] Assignee: Teledyne Industries, Inc., Los Angeles, Calif.
[22] Filed: Nov. 4, 1974
[21] Appl. No.: 520,415

[52] U.S. Cl. .................................................. 73/398 C
[51] Int. Cl.² ............................................... G01L 9/12
[58] Field of Search ............. 73/398 C, 406, 407 R; 317/246

[56] References Cited
UNITED STATES PATENTS

| | | | |
|---|---|---|---|
| 2,367,866 | 1/1945 | Humphreys et al. | 73/398 C |
| 2,714,703 | 8/1955 | Ruderfer | 73/398 C |
| 3,479,879 | 11/1969 | Music | 317/246 |
| 3,859,575 | 1/1975 | Lee et al. | 317/246 |

Primary Examiner—Donald O. Woodiel
Attorney, Agent, or Firm—Marvin H. Kleinberg

[57] ABSTRACT

A high precision pressure transducer utilizing a fluid-tight evacuated pressure capsule having a diaphragm forming the wall portion of the pressure capsule. Deflection of the diaphragm controls variations in an extremely small gap spacing between two associated pairs of capacitor plates positioned within the evacuated capsule. The variations in capacity of the two variable capacitors is used to electrically vary the frequency of an associated electrical oscillator. The sensitivity to deflections is very high, permitting relatively thick, very low deflection, very low stress diaphragms to be utilized, which in the substantially completely symmetrical mechanical and electrical arrangement of the pressure capsule produces extremely high stability and accuracy of operation.

13 Claims, 17 Drawing Figures

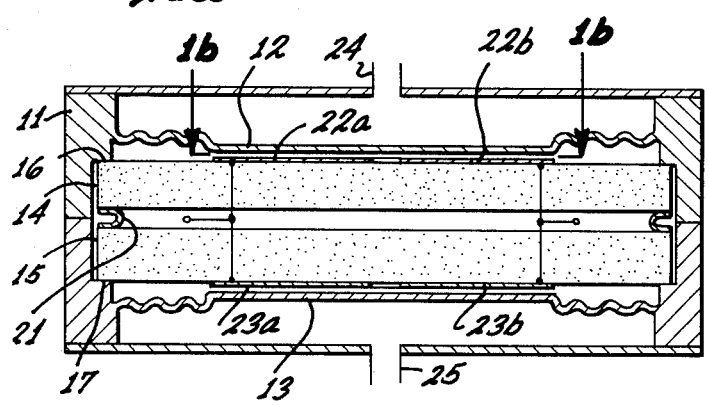
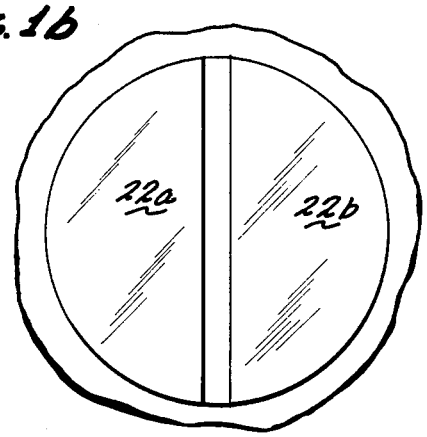
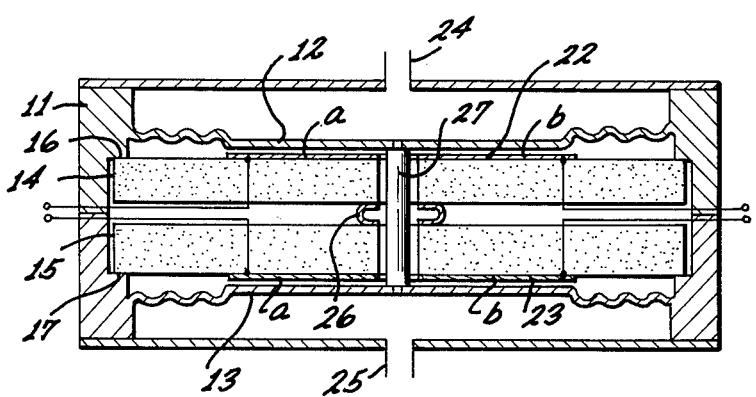
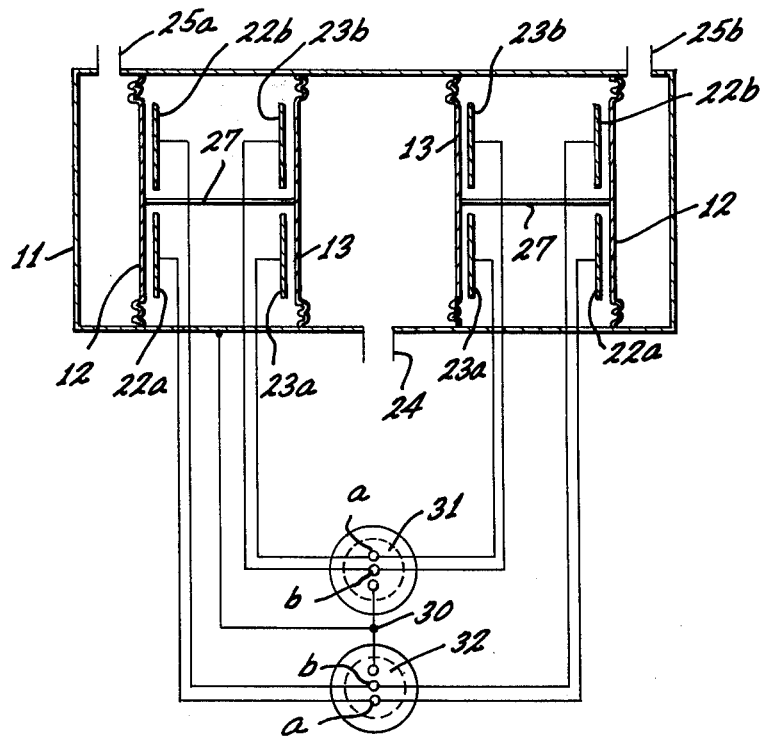

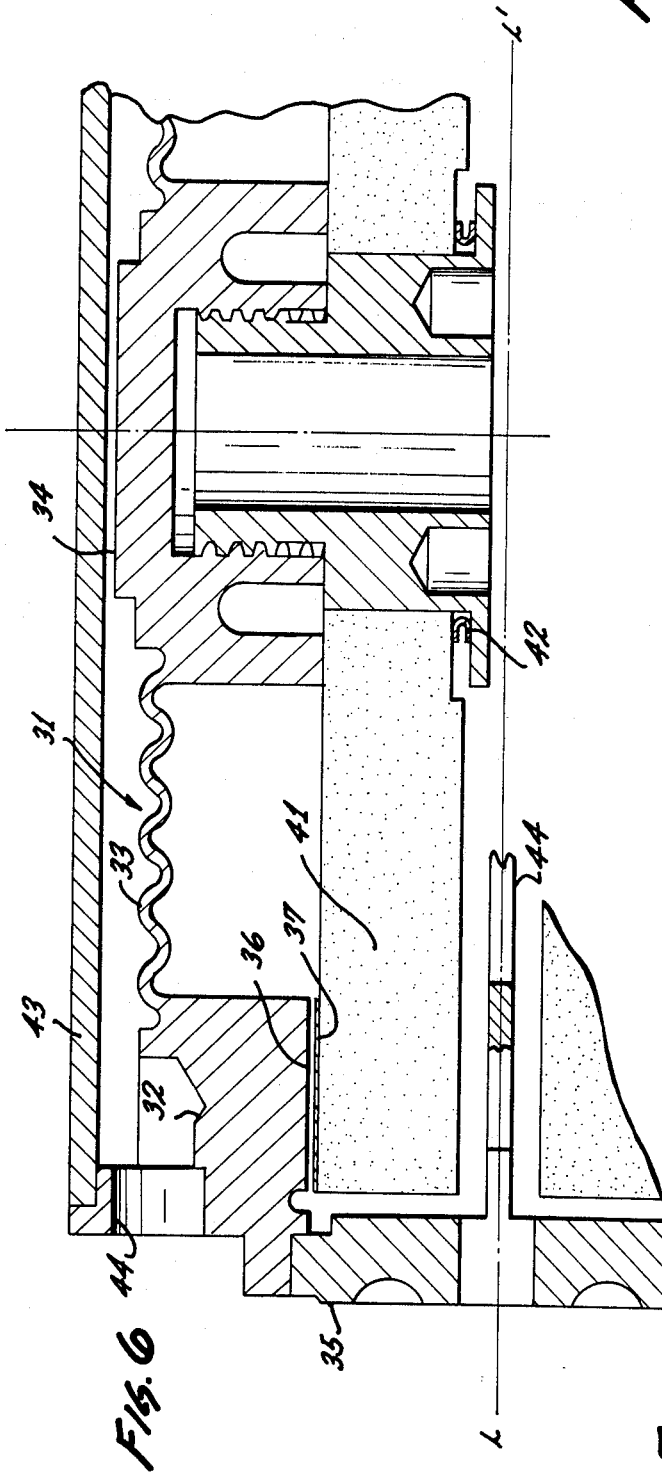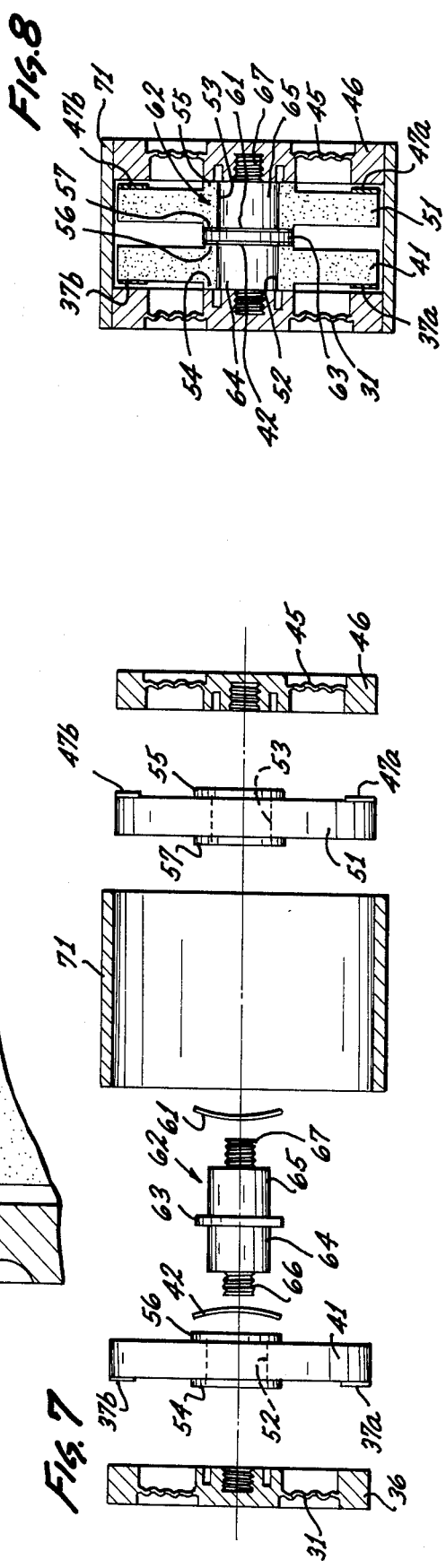

PRESSURE TRANSDUCER

BACKGROUND OF THE INVENTION

1. Field of the Invention:

The present invention pertains to pressure-responsive devices and more particularly to a pressure transducer suitable for accurately converting pressures into a useful electrical signal.

2. Description of the Prior Art:

In order to achieve accurate pressure measurement, the prior art has generally employed vibrating devices, wherein the elastic vibrations of the structural material is converted into an electrical output. Both vibrating diaphragms and vibrating cylinders have been employed in the prior art. These require a driving mechanism to move the vibrating element. As a result, such prior art vibrating devices have been complex and are relatively fragile.

Other pressure transducers hertofore known in the art have employed deflecting diaphragms in a variety of configurations. Due to mechanical hysteresis, creep, and nonlinearity, such diaphragm transducers have lacked the desired accuracy and precision. While some deflecting diaphragm transducers known in the prior art have been rugged, it has not been possible to combine the desired accuracy and repeatability with the ruggedness required for airborne or oceanographic instruments.

In addition, in the case of vibrating instruments, pressure is determined by measuring the resonant frequency of the mechanical elements subjected to pressure. Such sensors are density-sensitive, and are limited to gaseous media. Changing from one gas to another, such as from air to bottled nitrogen, for example, requires different calibration of the frequency-pressure characteristic.

SUMMARY OF THE INVENTION

The pressure-sensing element of the pressure transducer of the present invention consists of relatively thick but flexible metallic diaphragm and a rigid, non-conductive flat plate with metallized, conductive areas cooperating with the diaphragm to form a highly sensitive displacement sensor. The high sensitivity of the displacement sensor permits the use of a relatively thick, low displacement diaphragm. While the diaphragm is flexible, the walls are thick enough to enable the deflection of the diaphragm to substantially approach zero. As a result, the diaphragm operates along an essentially linear portion of the stress-strain curve, with very low resulting hysteresis. Under pressure, the diaphragm deflects minutely, varying the gap between the diaphragm and the conductive areas on the rigid non-conductive plate. This varies the capacity of the capacitors formed between the conductive plate and the conductive areas on the non-conductive plate.

The diaphragm, as stated hereinabove, is a low-deflection, low-hysteresis design. The ratio of its wall thickness to diameter is much higher than in conventional diaphragms. Flexibility is achieved through corrugations on the perimeter of the diaphragm, but flexibility may be made very low. In addition, distortions due to assembly by welding can be almost entirely eliminated in one of the preferred embodiments of the present invention.

Changes in pressure are numerically represented by employing the capacities of the capacitors as frequency-determining components of an oscillator circuit. In one embodiment, two sets of capacitors and two oscillators are used to achieve greater linearity. Both oscillator outputs are applied to a differential counter which registers the difference in the number of cycles counted over a fixed period of time, thereby giving a numerical output representing the applied pressure variation. By proper selection of frequency and time or through use of scale factors, the numerical output may be made direct reading, as pounds per square inch, dynes per square centimeter, etc.

In a preferred embodiment of the invention, two such diaphragms and their associated capacitor pickoff arrangements are utilized in a single evacuated pressure cell. The two diaphragms form the top and bottom walls, respectively, of a single, generally cylindrical, evacuated pressure cell and their corresponding capacitive pickoff arrangements are symmetrically positioned adjacent the respective diaphragms within the evacuated pressure cell. The pressure capsule is constructed with great precision employing approximately matched symmetrically positioned diaphragms, capacitive pickoff elements, and other parts in a gauge-block type of construction. Because of the great symmetry of this arrangement, it promotes symmetrical heat flow and symmetrical distributions of internal stresses, creating conditions which help in maintaining its dimensional stability. Electrical stability of the pressure capsule and insensitivity to air density is promoted by the fact that the pressure capsule is evacuated so that in its most basic aspects, diaphragm deflection is indicative only of the applied pressure. If, in application, the pressure to be measured is applied to both diaphragms of the symmetrical sensor, so that both diaphragms are measuring the same applied pressure, then this symmetrical sensor, or pressure capsule, will be insensitive to position change and to steady acceleration or g forces. Many other superior performance characteristics are developed in this highly symmetrical double diaphragm evacuated pressure capsule constructed according to the preferred embodiment of the invention.

In other applications, the preferred embodiment, symmetrical, double diaphragm, pressure capsule, is adapted to measure differential pressure between two applied pressures by mechanically linking the two diaphragms within the evacuated capsule so that they are constrained to move together and their net movement becomes representative of the difference in the pressure applied to the two diaphragms. In such application, all of the superior performance characteristics of the preferred embodiment pressure capsule are maintained except that the insensitivity to orientation and g forces is lost. Such insensitivity to position change and to acceleration or g forces can be regained, however, by utilizing two such differential pressure capsules in an axially aligned configuration, as described in more detail herebelow.

BRIEF DESCRIPTION OF THE DRAWINGS

FIG. 1 including FIG. 1a and FIG. 1b illustrates a simplified absolute pressure embodiment of the present invention, shown in cross-section in FIG. 1a and with certain parts illustrated in greater detail in FIG. 1b.

FIG. 2 illustrates a differential pressure version of the embodiment of FIG. 1.

FIG. 3 illustrates schematically a dual differential-pressure transducer embodiment of the present invention, which embodiment is insensitive to acceleration.

FIG. 6 is a detailed cross-sectional diagram of a portion of an embodiment of the present invention employing an annular diaphragm.

FIG. 7 is an exploded view of an embodiment.

FIG. 8 is an assembled view of the transducer illustrated in FIG. 7.

DETAILED DESCRIPTION OF THE DRAWINGS

Figure 4:
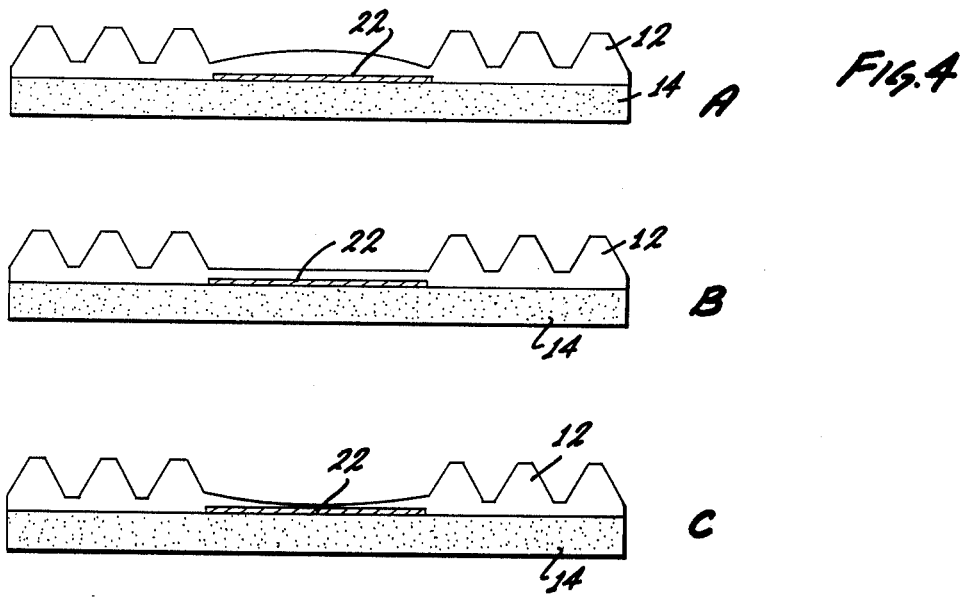
FIG. 4 illustrates the configuration and action of the diaphragm employed as part of the present invention.

Referring now to FIG. 1a, the pressure transducer of the present invention comprises a housing 11 preferably cylindrical, fabricated in two pieces, each with an integral diaphragm 12 and 13. A pair of non-conductive plates 14 and 15 are urged against shoulders 16 and 17 of the housing 11 by a retaining spring 21. A first non-conductive plate 14 is provided with two equal metallized areas 22, 22a, and 22b preferably in a shape of half circle as shown in FIG. 1b, cooperating with the flat portion of diaphragm 12. Similarly, a second non-conductive plate 15 is provided with two similar metallized areas 23a and 23b cooperating with the flat portion of diaphragm 13. The metalized areas 22a and 23a are electrically connected by means of a common terminal. Similarly connected are areas 22b and 23b. Thus, two equal capacitors are formed which have also symmetrical geometry. In this arrangement the following advantages are accomplished:

1. Both capacitors remain equal even if the gap on one side of the sensor is slightly different than the gap on the opposite side. This fact allows larger tolerances in manufacturing and assembly while making the sensor more accurate.
2. g forces acting in the sensitive direction of the axis of symmetry are self-compensated because while one gap will increase under such unidirectional load the other gap will decrease by the same amount causing no resultant effect on the output.
3. In the differential transducer such as shown on FIG. 3 the effects of thermal expansion are also cancelled as equal expansion errors in the gaps on the opposite side of each sensor will be subtracted from each other leaving the output unchanged. The area between the non-conductive plates is evacuated and the pressure to be sensed is applied to input passages 24 and 25.

The diaphragms 12 and 13 are designed with a flat circular center and a flexible perimeter. Under pressure, the diaphragms deflect and the gap length between each diaphragm and the metallized area on the corresponding non-conductive plate decreases. Each set or pair of these two parts combines to form a variable capacitor the capacity varying directly in response to changes of pressure. Although shown only schematically, it should be understood that flexible conductive wires are connected to each of the metallized areas 22a and b and 23 a and b and are led out through suitable insulators in the walls of housing 11 to give external electrical access to one plate of each variable capacitor. Electrical access to the other plate of each capcitor is provided by an electrical connection to housing 11. This configuration is adapted for measuring absolute pressure. The modifications illustrated in FIG. 2 are used to employ the transducer as a differential pressure gauge which measures the difference between two applied pressures.

The embodiment of FIG. 2 is substantially similar to that disclosed in connection with FIG. 1. However, non-conductive plates 14 and 15 are provided with a centrally located aperture; and a rigid spacer 27 is fastened securely to diaphragms 12 and 13. Thus, as the pressures applied to the chambers through ports 24 and 25 differ, the diaphragm exposed to the higher pressure will approach the metallized area of the non-conductive plate, while the other diaphragm will move away from the metallized area. It will be apparent, therefore, that the two capacities between the diaphragms and the metallized areas will vary oppositely to each other. Thus, if a higher pressure is applied through port 24, diaphragm 12 will approach metallized areas 22a and b and diaphragm 13 will be forced further away from metallized areas 23a and b, whereby the capacity of the two equal metallized areas forming two capacitors on the higher pressure side will be greater than that of the similar capacitor on the lower pressure side. Sensors of this configuration can be operated using two oscillators with a differential output or using one oscillator with one set of the capacitors, either 22a and b or 23a and b.

Because the metallized areas 22a and 23a are not connected to a common terminal in FIG. 2, and likewise for the metallized areas 22b and 23b, the transducer configuration of FIG. 2 is not self-compensating with respect to gravity and acceleration. In order to eliminate such position and acceleration sensitivity, two double-diaphragm capsules may be aligned axially, each pressurized in the opposite direction, as illustrated schematically in FIG. 3. Like parts illustrated schematically in FIG. 3 are numbered as the equivalent parts illustrated in cross-section in FIG. 2. One common pressure port 24 is provided between the two inner diaphragms; two other chambers are provided on the outside of diaphragms 12. The pressure chambers reached by ports 25a and 25b are connected together to a second pressure source. Two transducer capsules of the type illustrated in FIG. 2 are aligned axially, but each as described is pressurized in the opposite direction. The described transducer arrangement may, as shown in FIG. 3, be connected electrically as a differential transducer which is position and acceleration insensitive because the effect of *g* forces are cancelled. The diaphragms 12 and 13 are electrically connected in common to the case 11 which is connected to common or central output terminal 30 which is in turn connected to electrically common terminals of a pair of output connectors 31 and 32. The two capacitors formed by the diaphragms 13 and the metallized areas 23a are wired in parallel between connector 31a and ground 30. The capacity of this first combined capacitor is insensitive to acceleration and gravity forces. Likewise, the two capacitors formed by the diaphragms 13 and the metallized areas 23b are wired is parallel between connector 31b and ground 30. The capacity of this second combined capacitor also is insensitive to acceleration and gravity forces. Further, because of the identical geometry and size of the metallized areas, the capacities of the first combined capacitor and the second combined capacitor are equal and remain equal while the pressure is varied. Consequently, these two combined capacitors may be used in a Wien oscillator to sense the pressure differential between ports 24 and 25. That oscillator would be connected to connector 31.

An exactly similar argument can be made regarding the capacitors formed between the diaphragms 12 and the metallized areas 22. The combined capacitors thereby formed may be connected to a second Wien oscillator through connector 32. Although the use of two Wien oscillators is not necessary to measure the differential pressure, it is useful to use two Wien oscillators because improved linearity is thereby enabled.

Diaphragms 12 and 13 are constructed as low-stress, low hysteresis devices. The ratio of wall thickness to diameter is much higher than in conventional diaphragms. In one specific embodiment of the device of FIGS. 1 and 2 the ratio was 1 to 20. Since the stress is extremely low, the diaphragm operates on the linear portion of the stress-strain curve and there is virtually no hysteresis. The ratio of deflection to stress is very high. Since movement is very limited, the gap spacing may be quite small, and gap spacing in the neighborhood of .001 to .002 inch have been used satisfactorily.

The diaphragm as illustrated in FIGS. 1 and 2 may be fabricated of a thick nickel steel alloy. The ratio of thickness to diameter of the diaphragm may range from 1:20 to 1:40. The gap spacing is preferably less than 0.05 inch.

As known in FIGS. 4A, 4B, and 4C, the diaphragm may be optionally designed with a profile such that the diaphragm will operate in its most linear range for thte particular range of pressure which the transducer assembly is expected and designed to experience. The diaphragm assembly is designed with an outward bow as shown in FIG. 4A so that when the external applied pressure rises to the design range of pressure, the diaphragm profile is flattened and operates in its most linear range as shown in FIG. 4B. Further pressure increase produces further approximately linear downward deflection of the diaphragm as shown in FIG. 4C.

Figure 5:
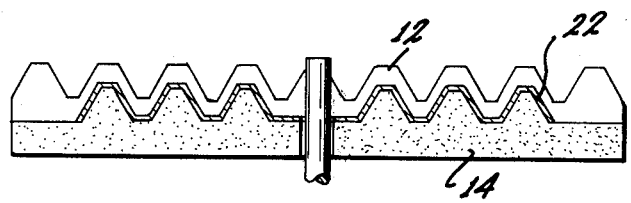
FIG. 5 illustrates a modification of the diaphragm according to the present invention.

In another modification of the present invention, an increased capacity between the diaphragm 12 and the metallized surface 22 on insulating plate 14 may be realized by turning the insulating plate 14 to provide undulations matching those of diaphragm 12, as illustrated in FIG. 5. Metallized surface 22, forming the other plate of the capacitor, is simply a metallized surface on the corrugated surface of plate 14 facing diaphragm 12. It is unlikely that the technique shown in FIGS. 4 and 5 would be required except in specialized applications.

FIG. 6 illustrates in partial cross-section a view of the transducer assembly according to the present invention, including an annular diaphragm 31. It is necessary to shown only about one quarter of the device in FIG. 6 because the device is circularly symmetric about the axial center line and has a right-left symmetry with respect to a plane perpendicular to that center line, said plane indicated by LL' in FIG. 6. The annular diaphragm comprises a rigid outer ring 32, an annular flexor portion 33, and a rigid hub 34 in the center. This embodiment provides a diaphragm of great structural stability which is easy to manufacture. As disclosed hereinabove in connection with the other diaphragms in the transducers of this invention, the flexible portion 33 is fabricated with concentric corrugations. The outer perimeter of the outer rigid ring 32 of diaphragm 31 is fixedly mated with a tubular center spacer 35 of the transducer. The inner parallel surface 36 of the rigid outer ring of the diaphragm serves as one of the plates of the variable capacitor. The other plate is provided by a metallized portion 37 on an insulating plate 41. Insulating plate 41 is retained in contact with central rigid hub 34 of the diaphragm by spring 42 and a threaded mating section 40 screwed to the hub. As will be apparent, changes in pressure applied to the diaphragm deflect the diaphragm to thereby move hub 34 and insulating plate 31, fixedly held against the rigid hub section 34 of diaphragm 31. As the diaphragm is moved its center hub section 34 causes insulating plate 41 to move accordingly, varying the gap between surface 36 and metallized area 37. An end plate 43 may be mounted in a gas-tight manner to the gas-tight assembly comprising tubular spacer 35 and the rigid end section 32 of diaphragm 31. A pressure input port 44 is provided to enable application of pressure to the volume contained between diaphragm 31 and end plate 43.

The tubular central spacer 35 whose upper half is shown in FIG. 6 has an annular inward projection 44 which serves as an electrical shield between the diaphragm support assembly, as shown in FIG. 6, which forms the top half of the complete transducer assembly; and, the corresponding identical bottom diaphragm support assembly (not shown) will be understood to form the bottom half of the complete transducer assembly. It will also be understood that conductive leads are led through hermetic insulating connectors in the side walls of the housing and connected to the metallized sections 37 to give external access to the plates of the respective capacitors.

A simplified exploded view of the annular diaphragm type of sensor of FIG. 6, adapted to provide differential pressure sensing, is illustrated in FIG. 7. A pair of diaphragms 31 and 45 have outer perimeters 36 and 46 cooperating with metallized surfaces 37a and b and 47a and b on insulating plates 41 and 45 to form four capacitors. The central apertures 52 and 53 of insulating plates 41 and 51 respectively, are provided with annular shoulders 54 and 55, cooperating respectively with the central portions of diaphragms 31 and 45 to define the spacing of the gap of the capacitors. Inner shoulders 56 and 57, machined as an integral part of insulating plates 41 and 51, bear against springs 42 and 61. A shoulder assembly 62 is provided with a central flange 63 upon which springs 42 and 61 rest, surrounding a cylindrical surface 64. Threaded portions 66 and 67 fit into the central threaded portions of diaphragms 31 and 45 respectively. The insulating plates 41 and 51 are urged by springs 42 and 61 so that shoulder surfaces 54 bear against the hub portions of diaphragms 31 and 45. The resultant assembly is placed within a cylindrical container 71, and the peripheries of diaphragms 31 and 45 are fixed to the walls of the container by making a peripheral seam weld at each end of container 71, at the top of each of the seams between the container and diaphragms 31 and 45. The completed transducer assembly fully assembled is shown in FIG. 8. Two of such transducer assemblies may then be placed in a pressure container to form a differential pressure transducer as illustrated in FIG. 3.

As before mentioned, the transducer, shown in FIG. 7, is illustrated fully assembled in FIG. 8. As will be apparent, critical surfaces such as the shoulder 54 cooperating with the hub of diaphragm 31, and the rim of insulating plate 41 cooperating with the rim 36 of diaphragm 31 may be readily turned and lapped or otherwise fabricated to provide extremely high accuracies and very low tolerances in the establishment of the gap spacing of the capacitors. As will be apparent, both plates of the variable capacitor formed by surface 36 and metallized surface 37, are completely rigid.

Note in FIG. 6 that the gap spacing between the plates of the capacitor pick-off, (i.e., between the surface 36 and the metallized surface 37), can be readily established and maintained with great accuracy and stability. The bottom surfaces of diaphragm 31 can be readily machined and lapped with great accuracy to render the planes of the surface 36 and the bottom surface of hub 34 completely flat and parallel to one another with a very small predetermined spacing between the planes of these two surfaces corresponding to the desired gap spacing of the capacitor. The insulating plate 41 which may be fabricated from a suitable ceramic may have its surface lapped completely flat with great accuracy. When the flat surface of insulating plate 41 is positioned against the flat bottom surface of hub 34 the spacing between metallized surface 37 and diaphragm ring surface 36 is automatically established and maintained at the predetermined value, varying only with deflection of the diaphragm in response to measured pressure variations. Maintenance of housing dimensions is not critical because the housing is not used in establishing gap dimension. High accuracy is especially facilitated in this gauge-block type of construction by the fact that at least one of the locating and operating surfaces involved (in this instance the surface of non-conductive plate 41) is uniplanar and can therefore be finished by conventional lapping processes to a very accurate flat surface. Because of the symmetry of the design of the transducer, effects on gap spacing dimensions of thermal expansion of the metal of diaphragm 31 are cancelled, except for uncompensated thermal expansion in a metal length corresponding to the gap spacing, an uncompensated effect which is rendered extremely small because of the very small gap spacing. Even this small residual uncompensated thermal expansion effect is largely compensated for by the matching thermal expansion effect in the matching diaphragm assembly (not shown) which comprises the other half of the transducer assembly of FIG. 6. Each individual diaphragm-capacitor sub-assembly may be checked individually, both mechanically and electrically, prior to completing assembly. Thus, great reliability may be insured.

Referring now to the coordination of the transducer systems of the present invention with their electrical output systems, as previously indicated, in such operation the capacitors formed in the transducer assembly are used to control the frequency of a very stable oscillator to give a frequency output indicative of the charge in capacitor gap spacing caused by deflection of the diaphragms of the transducers. A Wien bridge output oscillator is preferably employed because of its substantially linear relation between variation in output frequency with variation of the gap between the capacitor plates which is proportional to changes of pressure. Such Wien bridge oscillators, as are described in more detail hereafter in connection with FIGS. 10 and 11, utilize tow capacitors (provided by the tranducer assembly) as their frequency controlling elements. The two capacitors are connected in series so that one plate of one capacitor is electrically connected in common with a corresponding plate of the other capacitor. In the common type of Wien oscillator (which is described in connection with FIG. 10) the electrically common capacitor plates may not be grounded and have to be electrically floating (i.e., insulated from ground). If the modified or transposed type of Wien bridge of FIG. 11 is utilized, the electrically common capacitor plates can be grounded.

Referring first to the coordination of the transducer systems of the present invention with a conventional Wien bridge, it will be recognized that for any of the transducer assemblies shown and described thus far (the transducer assemblies of FIGS. 1, 2, 3, 6, 7, and 8), each assembly has at least one pair of equal capacitors or two pairs for a differential operation, each capacitor having as one of its plates the metallized surface of an insulating plate and having as the other of its plates the metal of the corresponding diaphragm (or diaphragm outer ring).

In each such arrangement, the capacitor plates provided by the diaphragms (or their outer rings) are connected together in common electrically through the conductive metal of the case or housing. Thus, for all the arrangements so far discussed, the diaphragms, since they are already connected in common, will serve as the electrically common capacitor plates utilized in the corresponding Wien brideg oscillator circuit.

Figure 10:
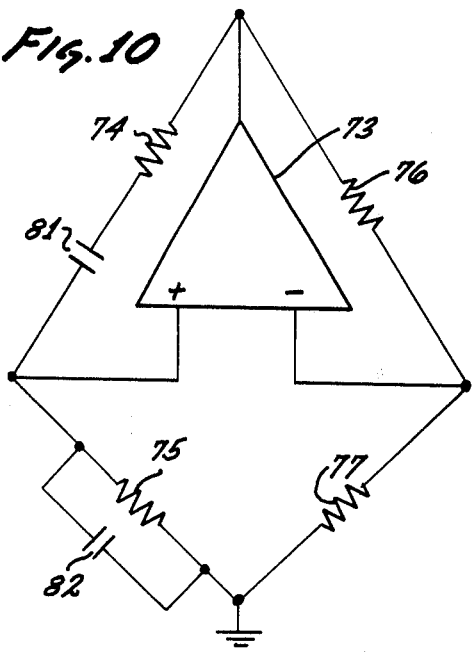
FIG. 10 schematically illustrates a conventional Wien bridge oscillator.
Figure 11:
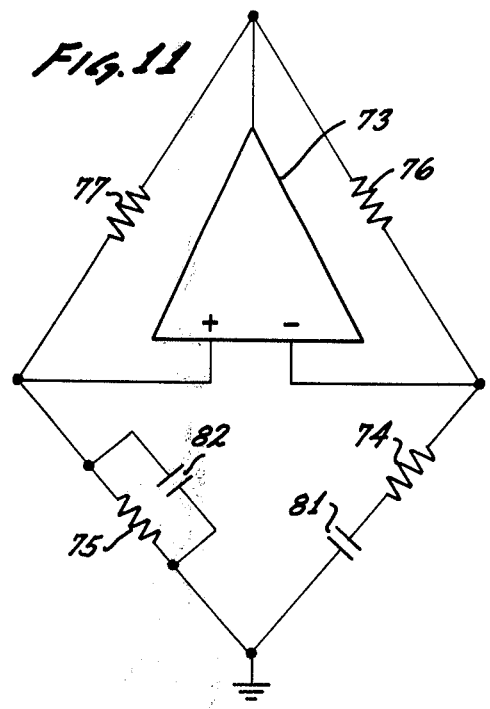
FIG. 11 illustrates a modified or "transposed" bridge oscillator which may be employed in connection with the present invention.
Figure 14:
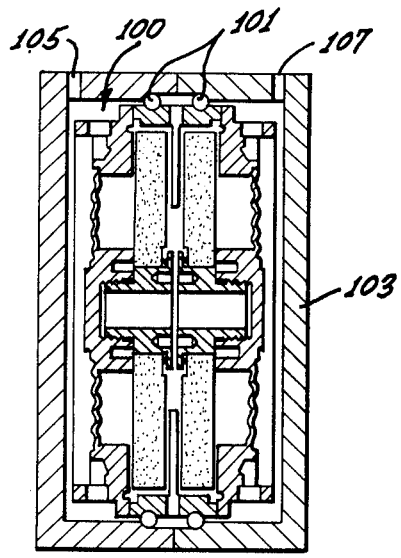
FIG. 14 indicates a transducer assembly adapted for use with a conventional Wien bridge oscillator as well as with a transposed or modified Wien bridge oscillator, the transducer assembly being insulatingly suspended within an enclosing electrically screening pressure container.
Figure 15:
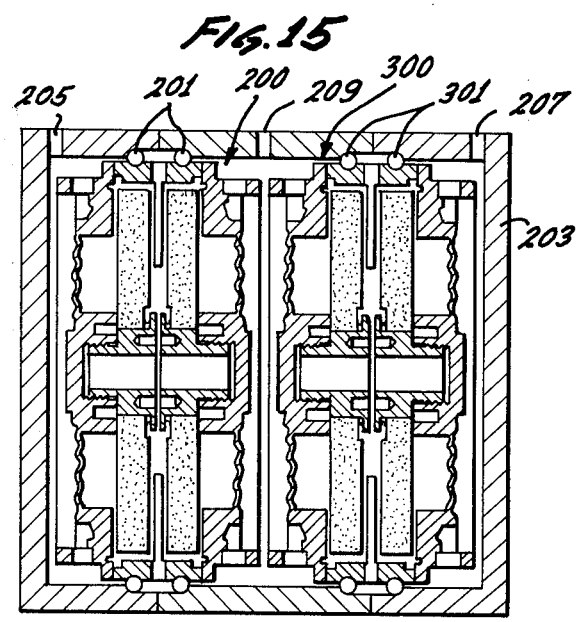
FIG. 15 shows a similar pressure container used to suspendingly enclose a pair of axially aligned differential pressure transducer assemblies.

If a common type of Wien bridge oscillator circuit is utilized (as shown in FIG. 10), with any of the before described transducer assemblies, since the common plates of such Wien oscillator may not be grounded, it is clear that the whole transducer assembly may have to be insulated and shielded inside a container. FIG. 14 shows, for example, an absolute pressure measuring transducer assembly (generally designated 100) similar to the internal assembly of FIG. 1, suspended by two insulating and pressure sealing O-rings within an enclosing pressure-tight housing 103, which has two entrance ports 105 and 107 for the entry of the pressure which is to be measured. Similarly, FIG. 15 shows two differential pressure measuring transducer assemblies, generally designated 200 and 300 respectively, each similar to the internal assembly of the transducer of FIG. 8, and each suspended by a pair of insulating and pressure sealing O-rings 201 and 301 respectively, within an enclosing housing 203 which has three entrance ports 205, 207, and 209 for the pressures which are to be applied. The pair of axially aligned differential pressure transducers yield the benefits (position and acceleration insensitivity) which have been discussed before in connection with FIG. 3.

Referring to FIGS. 14 and 15, the housings 103 and 203 will ordinarily be conductive and grounded so that they serve as grounded shielding containers. One difficulty presented in utilizing such container for insulated suspension and shielding of transducer assemblies, is that stray capacities between the elements of the transducer and the enclosing housing may diminish the linearity and accuracy of operation of the associated Wien oscillator. Another difficulty is presented by the bulk, complexity, weight, and cost of the mechanical structure.

It is desirable in some applications therefore to have a transducer assembly which does not require this type of enclosing suspension housing. One way in which this can be done is to utilize a modified or "transposed" Wien oscillator, such as shown in FIG. 11, in which the common capacitor plates may be grounded. In such usage, the ordinary housing of the transducer assembly may be directly electrically grounded and therefore no external insulating suspension housing is required.

Figure 9:
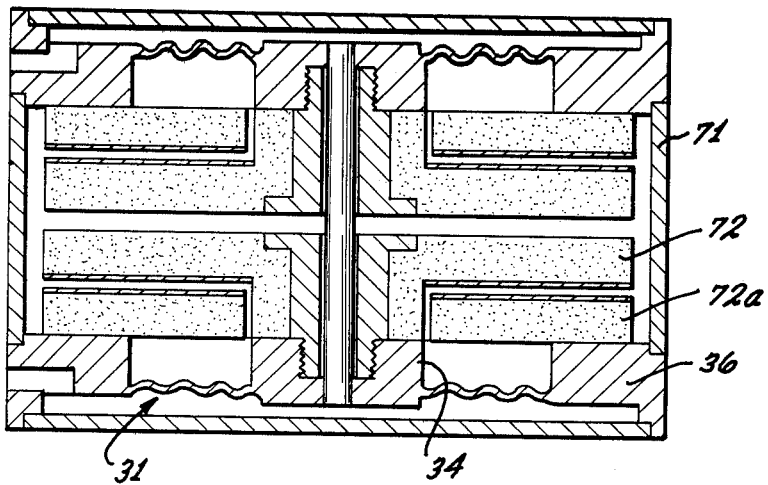
FIG. 9 illustrates an embodiment of the present invention especially adapted for use with a conventional Wien bridge oscillator.

Another possible solution to the problem of providing a transducer whose regular case can be directly grounded will be discussed in connection with the embodiment shown in FIG. 9. A differential presssure transducer designed for use with conventional Wien bridge oscillator (such as that shown in FIG. 10) is illustrated therein. As illustrated, hub 34 of diaphragm 31 cooperates with a rimmed spindle insulating plate 72, moving insulating plate 72 as diaphragm 31 reacts to pressure changes. The fixed outer ring 36 of diaphragm 31 has firmly mounted thereto another insulating plate 72a having an annular configuration. Plate 72a is fixed, while plate 72 is moved by the diaphragm hub 34. Opposing surfaces of plates 72a and 72 are metallized, providing the two capacitor plates. As will be apparent, the capacitors in the two sections of the differential pressure transducer, illustrated in FIG. 9, are completely independent of one another, not having any common terminals. Further, in this configuration, the case comprising the diaphragms and the cylindrical envelope 71 may be grounded since they are electrically independent from the capacitors.

The ordinary Wien oscillator, shown in FIG. 10, and the modified or "transposed" Wien oscillator, shown in FIG. 11, will now be discussed in greater detail.

Referring now to FIG. 10, a conventional Wien bridge oscillator is illustrated therein. An amplifier 73 is mounted in an RC bridge including resistors 74, 75, 76, and 77.

The output of amplifier 73 is fed back to the input through the bridge arrangement to provide regeneration and the fed-back voltages are in phase at only one frequency due to the phase relationships developed across the series arm 74–81 and the parallel arm 75–82. These vary in opposite directions as the frequency changes. At the resonant frequency the total phase shift is zero. Resonant frequency $f_r$ is determined by the expression $$f_r = \frac{1}{2\pi \sqrt{R_{74} C_{81} R_{75} C_{82}}}$$

In the present configuration, it will be understood that capacitors 81 and 82 are both variable, each being the capacitor formed by a transducer diaphragm and the metallized area of the corresponding insulating plate.

As is apparent from FIG. 10, in the conventional Wien bridge oscillator, the capacitors may have a common plate, but this common plate may not be grounded. The other (non-common) plate of capacitor 82 is normally grounded as illustrated. In the absence of inordinate stray capacity paths, the frequency output variations of this Wien bridge oscillator will be directly related to the variation in capacitor gap spacing and hence to the pressure variation which causes diaphragm deflection.

The non-linear relationship caused by stray capacity may be avoided by employing the transposed Wien bridge oscillator illustrated in FIG. 11, where like numbers designate like elements similar to those illustrated in the conventional Wien bridge oscillator in FIG. 10. As will be apparent, capacitors 81 and 82 have a common ground. With this arrangement, the body of the transducer, together with the two diaphragms form a common grounded plate, while the two metallized insulating plates form the independent plates of the two capacitors 81 and 82.

Figure 12:
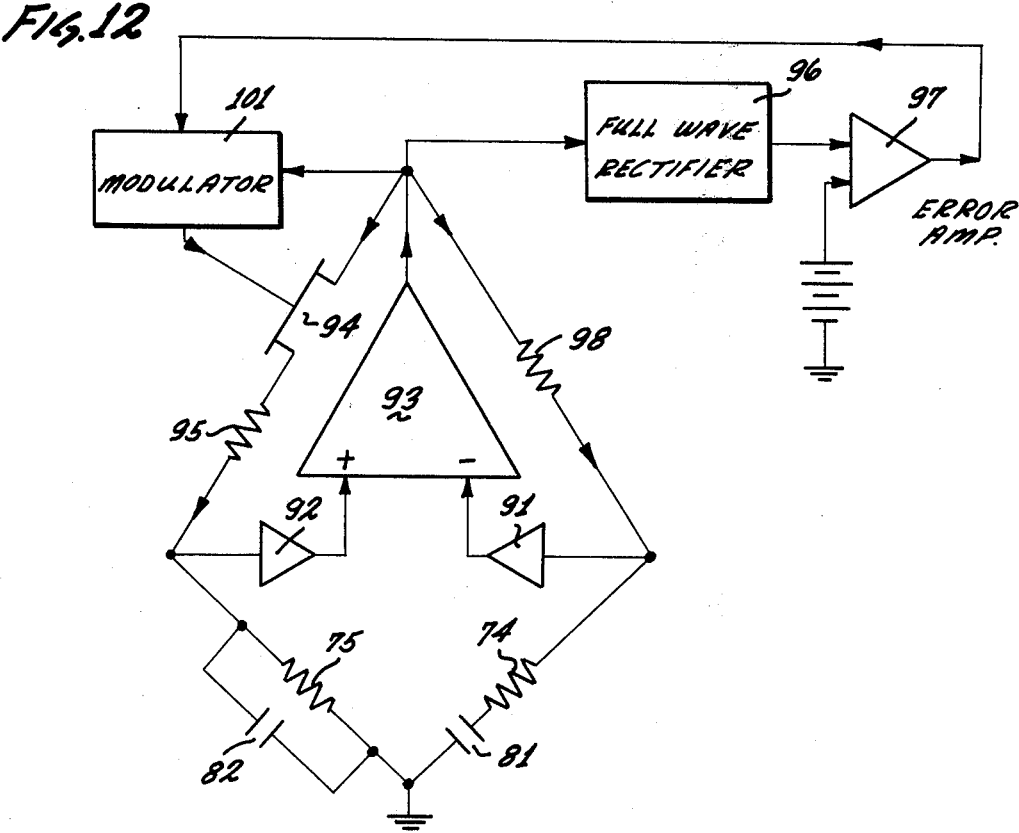
FIG. 12 is a block diagram illustrating in more detail a modified Wien bridge oscillator which may be utilized in the present invention.

A block diagram of the novel transposed Wien bridge oscillator is illustrated in FIG. 12. The transducer 84 includes pressure-responsive capcitors 81 and 82, defined by the diaphragms and metallized areas described hereinabove. A plate of each capacitor, together with the case, are grounded. Resistor 75 is connected in parallel with capacitor 82, and resistor 74 is connected in series with capacitor 81, as illustrated also in FIG. 11. The arm of the bridge containing capacitor 81 is connected to the input of a buffer amplifier 91, and the arm of the bridge containing capacitor 82 is connected to the input of a buffer amplifier 92. The outputs from buffer amplifier 91 and 92 are combined by operational amplifier 93. A filed effect transistor 94, rectifier 96 and resistor 98 are connected with the output of operational amplifier 93. In addition, the output of operational amplifier 93 is connected to the input of modulator 101. An output of rectifier 96 is connected to one input of error amplifier 97, where it is compared with the voltage from a reference voltage source 99. The output error voltage from error amplifier 97 is also connected to the input of modulator 101. The gate of field effect transistor 94 is connected to the output of modulator 101.

In the circuit of FIG. 12, the effective value of resistor 74 or resistor 95 must be controlled to sustain the proper amplitude of oscillation. This control is obtained by means of field effect transistor 94. The gate signal to field effect transistor is provided by comparing the output of the oscillator, rectified by rectifier 96 with the reference voltage from voltage source 99 and modulating the error signal with the output of the oscillator. An output pulse train at the frequency of oscillation is also provided by rectifier 96. In overall operation, the transmission or impedance of field effect transistor 94 is controlled by the modulated error signal output so as to maintain stability of oscillation of the overall transposed Wien bridge oscillator of FIG. 12.

Figure 13A:
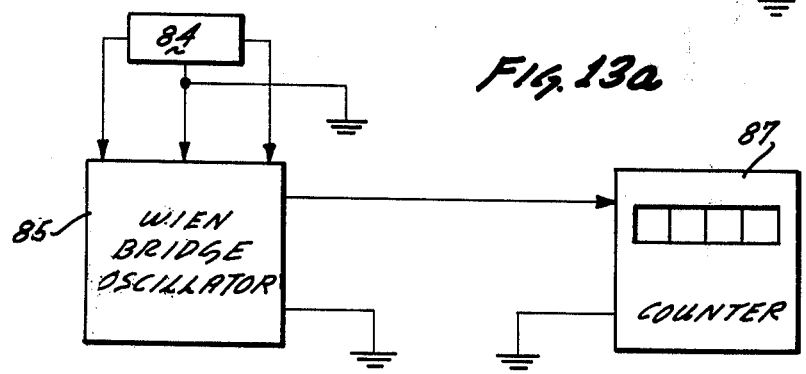
FIG. 13 including FIG. 13a and FIG. 13b illustrates schematically pressure read-out means employed with the present invention.
Figure 13B:
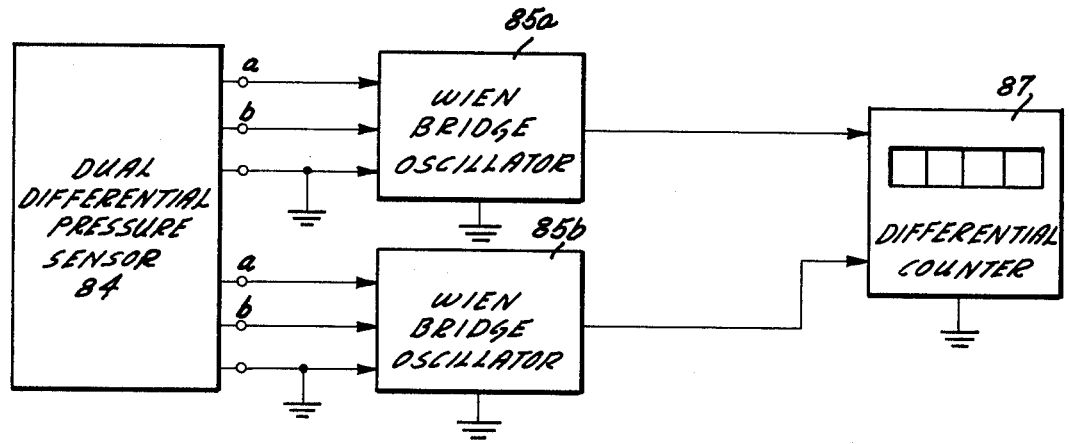

Typical read-out arrangements for the transducer in the present invention are illustrated in FIG. 13. The transducer 84 forms part of a Wien bridge oscillator 85. The frequency of oscillation of the Wien bridge is determined by the two capacities forming the elements of the transducer. In FIG. 13a, a counter 87 is shown which counts the number of cycles of oscillation occurring in a predetermined time interval. This count represents the pressure sensed. In FIG. 13b is shown a readout technique for use with the dual differential pressure sensor of FIG. 3. The change of capacity of the plates numbered 22 is opposite to the change of capacity of the plates numbered 23 in response to a pressure differential. The connector terminals shown in FIG. 13b are the same as those numbered 31 and 32 in FIG. 3. Thus, in response to a pressure differential, the frequency of Wien bridge oscillator 85a will change in a manner opposite to the frequency of Wien bridge oscillator 85b. Both oscillators sense the pressure differential; one oscillator responds by decreasing its frequency and the other oscillator responds by increasing its frequency. Their combined effect can be used to advantage by measuring the difference in the frequencies by use of the differential counter 87 shown in FIG. 13b.

What is claimed as new is:

1. A fluid pressure transducer comprising:
   a fluid-tight container;
   a first diaphragm forming a wall portion of said container, said first diaphragm having a rigid perimeter with an inner peripheral flat portion fixed to said container, said first diaphragm further including a rigid central hub and annular corrugations between said hub and said perimeter;
   a rigid insulating disc having two substantially equal semi-annular areas of conductive material adjacent to and cooperating capacitively with said inner peripheral flat portion of said disc-shaped wall;
   a second diaphragm forming a wall portion of said fluid-tight container, said second diaphragm having a rigid perimeter with a second inner fixed peripheral flat portion fixed to said container, said second diaphragm further including a second rigid central hub and annular corrugation between said hub and said perimeter;
   a spindle rigidly interconnecting the rigid central hubs of said diaphragms;
   a second rigid insulating disc having two substantially equal semi-annular aresa of conductive material in capacitive relationship with said second inner fixed peripheral flat portion of said second diaphragm; and
   means for mounting said rigid insulating discs on said spindle for movement with said rigid central hubs; whereby differential pressure applied to said disc-shaped walls increases the capacitances between one pair of semi-annular conductive areas and the corresponding peripheral flat portion of one of the diaphragms and decreases the capacitances between the other pair of semi-annular conducting areas and the corresponding peripheral flat portion of the other diaphragm.

2. The fluid pressure transducer set forth in claim 1 wherein said spindle has a central shoulder and a first and second resilient ring, one on either side of said central shoulder, said spindle urging each of said rigid insulating discs against each of said rigid central hubs.

3. In the fluid pressure transducer set forth in claim 2, a shoulder of predetermined depth dimension formed on each of said rigid insulating discs facing against the corresponding rigid central hub to define the dimensions of the capacitive gaps between said conductive rings and said peripheral flat portions.

4. In the fluid pressure transducer set forth in claim 1, means for varying an electrical frequency in response to differential pressure comprising:
   amplifier means having a positive input terminal, a negative input terminal, and an output terminal;
   means connecting one of said semi-annular conductive areas to said positive input terminal of said amplifier means and connecting the corresponding cooperating diaphragm to ground potential, defining a first variable capacitor with a grounded plate;
   a first resistor connected in parallel with said first capacitor;
   a second resistor, having two terminals, one of which is connected to said negative input terminal of said amplifier means;
   means connecting a second semi-annular conductive area to the remaining terminal of said second resistor and connecting the corresponding cooperating diaphragm to ground potential, defining a second variable capacitor with a grounded plate electrode;
   a third resistor connected between said positive input terminal and said output terminal of said amplifier means; and
   a fourth resistor connected between said negative input terminal and said output terminal of said amplifier means.

5. A fluid pressure transducer comprising:
   an evacuated fluid-tight container having a first diaphragm forming a wall portion thereof, said first diaphragm having a rigid perimeter and a central portion elastically deflectable with respect to said perimeter;
   means for applying a fluid pressure, which is to be measured, to the external surface of said first diaphragm to deflect said central portion of first diaphragm inwardly with respect to the rigid perimeter of said first diaphragm in accordance with the variations in applied pressure;
   opposed pairs of first and second conductive areas positioned within said evacuated container with a predetermined initial gap spacing therebetween to form the plates of two substantially equal capacitors A and B;
   means mechanically coupling said first conductive areas to the rigid perimeter of said first diaphragm;
   means mechanically coupling said second conductive areas to said central portion of said diaphragm for movement therewith to vary together the gap between the plates of capacitors A and B in accordance with the deflection of said first diaphragm;
   means for making separate electrical connections to each of said plates of each capacitor A and B;
   a first rigid, annular, insulated plate positioned on an interior shoulder of said rigid perimeter of said first diaphragm;
   a second rigid insulating plate positioned within said evacuated container and having a face thereof immediately opposite a face of said first rigid plate, said second rigid plate being fixedly connected to said central portion of said first diaphragm for movement therewith;
   said first conductive areas and said second conductive areas being established on the opposing faces of said first insulated plate and said second insulated plate respectively, to form the plates of two variable capacitors whose gap spacings are varied together in accordance with the deflection of said central portion of said first diaphragm with respect to said rigid perimeter of said first diaphragm.

6. A fluid pressure transducer comprising:

an evacuated fluid-tight container having a first diaphragm forming a wall portion thereof, said first diaphragm having a rigid perimeter and a central portion elastically deflectable with respect to said perimeter;

means for applying a fluid pressure, which is to be measured, to the external surface of said first diaphragm to deflect said central portion of first diaphragm inwardly with respect to the rigid perimeter of said first diaphragm in accordance with the variations in applied pressure;

opposed pairs of first and second conductive areas positioned within said evacuated container with a predetermined initial gap spacing therebetween to form the plates of two substantially equal capacitors A and B;

means mechanically coupling said first conductive areas to the rigid perimeter of said first diaphragm;

means mechanically coupling said second conductive areas to said central portion of said diaphragm for movement therewith to vary together the gap between the plates of capacitors A and B in accordance with the deflection of said first diaphragm;

means for making separate electrical connections to each of said plates of each capacitor A and B;

a second diaphragm forming a wall portion of said evacuated fluid-tight container, said second diaphragm having a rigid perimeter and a central portion elastically deflectable with respect to said perimeter;

means for applying said fluid pressure, which is to be measured, to the external surface of said second diaphragm;

opposed pairs to third and fourth conductive areas positioned within said evacuated container with a predetermined initial gap spacing therebetween to form the plates of two substantially equal capacitors C and D;

means mechanically coupling said third conductive areas to the rigid perimeter of said second diaphragm;

means mechanically coupling said fourth conductive areas to said central portion of said diaphragm for movement therewith to vary together the gap between the plates of capacitors C and D in accordance with the deflection of said second diaphragm; and means for making separate electrical connections to each of said plates of each capacitor C and D.

7. The fluid pressure transducer defined in Claim 6 which further includes a capacity sensitive variable frequency oscillator having its input electrically connected to capacitors A and B formed by said first and second conductive areas, said oscillator varying the frequency of its output signal in accordance with variations in capacity of the first and second capacitors.

8. The fluid pressure transducer defined by Claim 7 wherein said first conductive areas are electrically connected and including means for insulating said first conductive areas from gound.

9. The fluid pressure transducer defined by Claim 8 wherein said oscillator is a Wien bridge oscillator.

10. The fluid pressure transducer defined by Claim 7 wherein said first and third conductive areas are electrically connected and are connected to ground.

11. The fluid pressure transducer of claim 10 wherein said oscillator is a transposed Wien bridge oscillator.

12. A fluid pressure transducer comprising:

an evacuated fluid-tight container having a first diaphragm forming a wall portion thereof, said first diaphragm having a rigid perimeter and a central portion elastically deflectable with respect to said perimeter;

means for applying a fluid pressure, which is to be measured, to the external surface of said first diaphragm to deflect said central portion of first diaphragm inwardly with respect to the rigid perimeter of said first diaphragm in accordance with the variations in applied pressure;

opposed pairs of first and second conductive areas positioned within said evacuated container with a predetermined initial gap spacing therebetween to form the plates of two substantially equal capacitors A and B;

means mechanically coupling said first conductive areas to the rigid perimeter of said first diaphragm;

means mechanically coupling said second conductive areas to said central portion of said diaphragm for movement therewith to vary together the gap between the plates of capacitors A and B in accordance with the deflection of said first diaphragm;

means for making separate electrical connections to each of said plates of each capacitor A and B;

said rigid perimeter of said first diaphragm having an annular internal shoulder within the interior of said evacuated container, said first conductive areas being established on the flat surface of said shoulder and said second conductive areas being established on an immediately opposing surface of a rigid insulating plate positioned within said container and mechanically coupled to said central portion of said diaphragm for movement therewith to vary the capacity between the conductive areas on said rigid insulating disc and the conducting areas on said shoulder.

13. A fluid pressure transducer comprising:

a fluid-tight container;

a diaphragm forming a wall portion of said container, said diaphragm having a rigid perimeter with an inner peripheral flat portion fixed to said container and further having a rigid central hub and annular corrugations between said hub and said perimeter;

a first rigid insulating disc fixed to said inner peripheral flat portion;

a second rigid insulating disc having a shoulder fixed to said rigid central hub and adapted to move with said hub as said diaphragm flexes in response to applied pressure; and two conductive areas of substantially equal size on said first rigid insulating disc and two matching cooperating conductive areas on said second insulating disc, wherey two capacitors are defined each having a gap varying said diaphragm flexes.

* * * * *